Feb. 25, 1941.                W. F. GROENE ET AL                2,233,310
                                 CRANKSHAFT CHUCK
                              Filed July 10, 1939              3 Sheets-Sheet 1
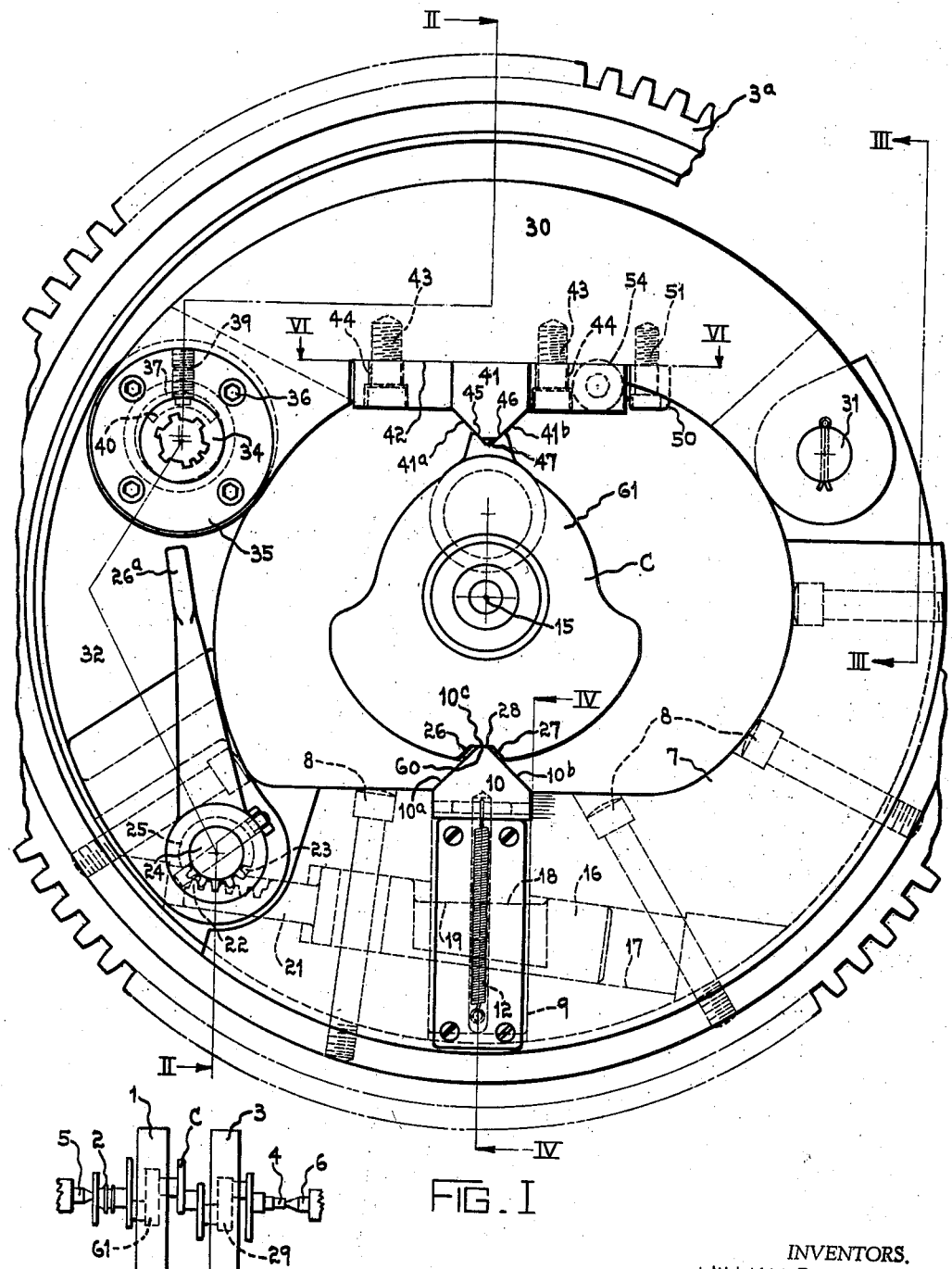
FIG. I
FIG. VII
INVENTORS.
WILLIAM F. GROENE
WALTER R. MEYER
BY Willard S. Groene
ATTORN*

Feb. 25, 1941.  W. F. GROENE ET AL  2,233,310
CRANKSHAFT CHUCK
Filed July 10, 1939  3 Sheets-Sheet 2
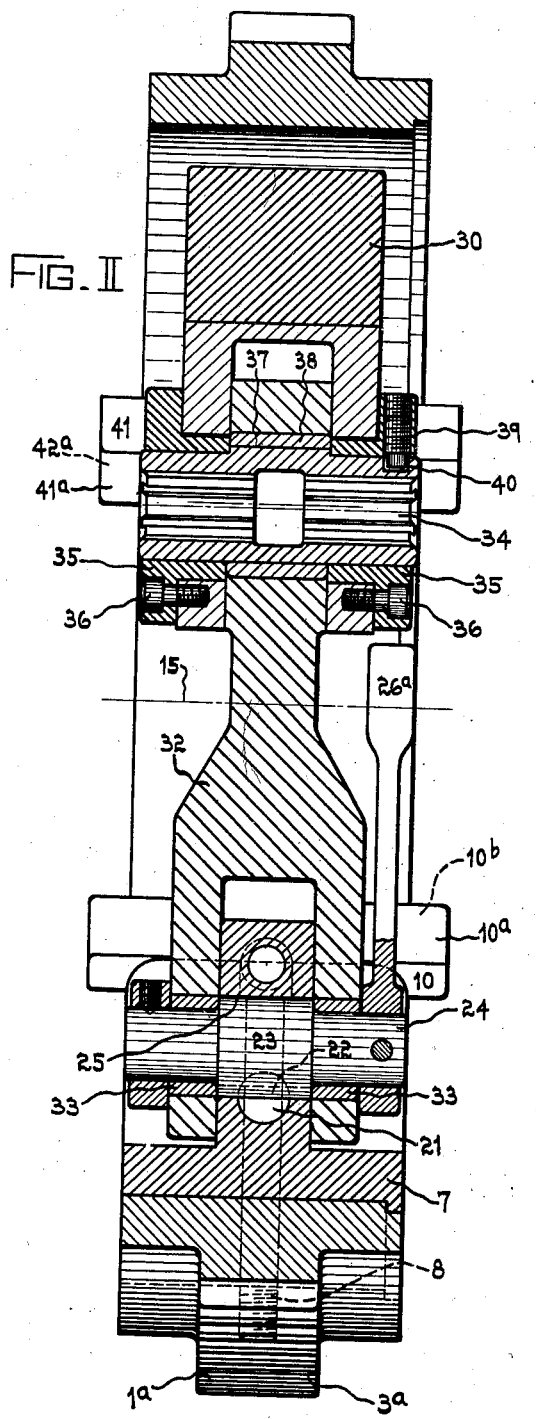
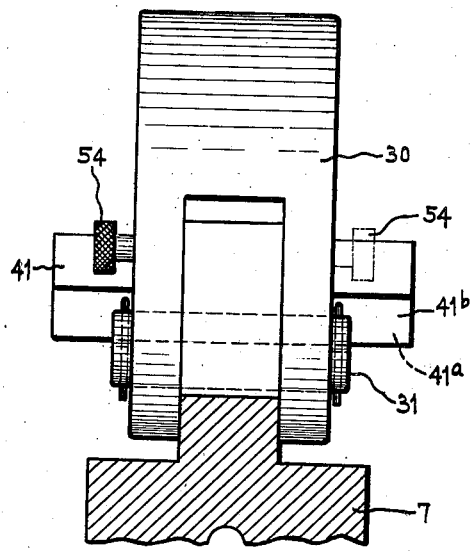
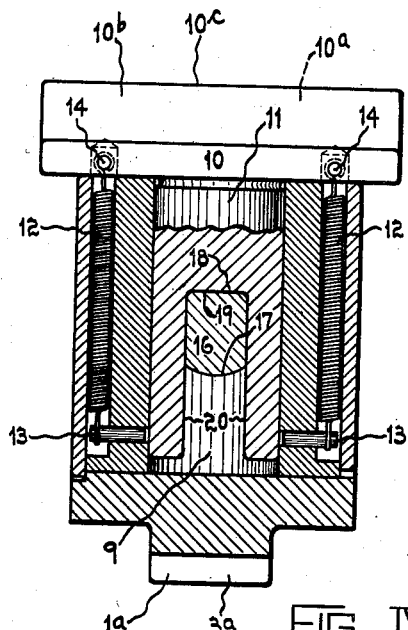
INVENTORS.
WILLIAM F. GROENE
WALTER R. MEYER
BY
ATTORNEY.

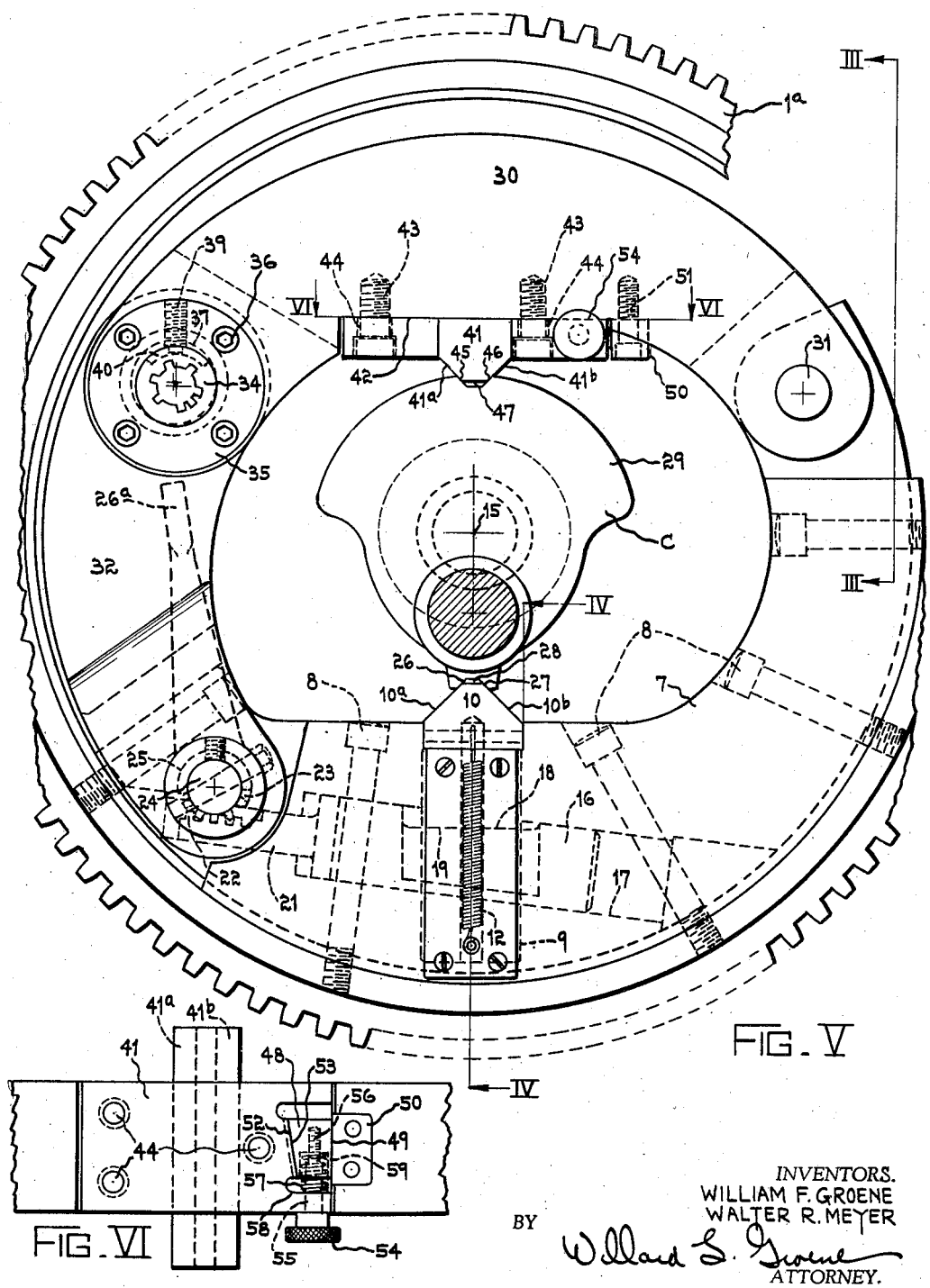

Patented Feb. 25, 1941

2,233,310

UNITED STATES PATENT OFFICE 2,233,310

CRANKSHAFT CHUCK

William F. Groene and Walter R. Meyer, Cincinnati, Ohio, assignors to The R. K. LeBlond Machine Tool Company, Cincinnati, Ohio, a corporation of Delaware Application July 10, 1939, Serial No. 283,605

7 Claims. (Cl. 82—40)

This invention pertains to a method and apparatus for chucking crankshafts in a lathe for turning the bearing portions thereof. More particularly this invention pertains to chucking procedure used in conjunction with center drive lathes for machining the line bearing portions of crankshafts, for example, machines of a character shown in Patents Re. 20,090 dated September 1, 1936, and 2,069,107 dated January 26, 1937.

The chucking of crankshafts in machines of this type has long been an exceedingly difficult task, particularly when it is complicated by the problem of rapidly machining large amounts of metal from the line bearings while at the same time rigidly supporting the crankshaft under such strained conditions and properly holding it with the highest degree of accuracy, so that when it is unchucked after the completion of the machining the machined parts will be in proper alignment. Particularly is this problem complex when it is necessary to grip a crankshaft by its rough irregular webs which is vital to the simultaneous turning of all of the line bearing portions of a crankshaft.

The chief factors which present themselves when chucking a crankshaft under these conditions are:

(a) To provide means for initially engaging the crankshaft to locate it without displacing it from its true and proper position with regard to the axis of rotation of the lathe.

(b) To provide proper clamping means associated with the positioning means (a) which firmly grips the shaft but which does not in any way displace the shaft from its proper position in the lathe.

(c) To provide work engaging means for gripping the rough webs of the crankshaft which permit proper operation of (a) and (b) and which will not slip or readjust themselves in any way during the turning operation which would thereby cause repositioning of the shaft in an inaccurate position.

Prior attempts to adequately solve these problems fall into two classes:

(1) Chucking devices for gripping the rough surfaces of the crankshaft webs utilizing equalizing jaws and frictional clamping mechanism, such for example as shown in Patent 1,617,403.

(2) Chucking devices utilizing fixed accurately located abutment means which engage accurately machined locating areas on the crankshaft web, such for example as shown in Patent 1,843,359.

Each of these former types of chucking arrangements for crankshafts has inherent defects which render them inefficient in solving the problems of accurately and positively holding the crankshafts during rapid removal of metal therefrom.

In the first type (1) above, it is found that the chuck invariably radially displaces the work piece from its true position on the axis of rotation of the lathe which thus causes the machining operations on the shaft to be inaccurate when the work is again unchucked. This is caused by attempting to grip the crankshaft by means of the rough surfaces of its webs. It is found that equalizing mechanism, which must necessarily be used to grip such surfaces, if made free enough to engage the shaft web without distorting it will not sufficiently hold the work against the action of the cutting tools. And likewise, when the equalizing mechanism is frictionally restricted in movement to prevent deflection of the shaft by the tools, it is found that the final clamping of the work causes it to be moved from true position in the lathe. The problem when using these types of chucks is further complicated by the rough, scaly surfaces of the webs which must be engaged by the gripping jaws, it being practically impossible to get a firm positive footing on the webs which will not slip because the rough projections on the webs crush down and flake off causing the jaws to become loosened and thus allowing the crankshaft to shift to a different and inaccurate position.

In the second type (2) above the use of the accurately machined locating areas on the web of the crankshaft have only proved satisfactory in properly holding the shaft in the lathe, providing these surfaces are accurately premachined. These areas have to be very accurately machined and this has been a difficult and costly problem to solve because it is hard to properly hold the crankshaft while cutting these areas and the wear of the cutters used to machine the areas causes variation in their accuracy and consequent variation in the product turned out by the crankshaft lathe, particularly in high speed production schedules. It has also been troublesome to load and unload work in the chucks when fixed locating areas are used because of the necessarily close fits between the surfaces on the shaft webs and the abutment surfaces in the chucks.

The intent of the present invention is to provide a chucking arrangement for crankshafts which has none of the inherent defects of the above former arrangements.

An object of this invention is to provide a chucking arrangement and procedure whereby a crankshaft may be accurately located in a lathe and positively held and driven without distortion while its bearing portions are being rapidly machined by the cutting tools of the lathe.

Another object is to provide a method of chucking a crankshaft in which the crankshaft is prepared with relatively inaccurate chucking surfaces machined in the webs of the crankshaft and to provide in a chucking device, abutment means to engage these surfaces in such a way as to accurately support the shaft in the lathe and to securely hold it there regardless of the shape and nature of the crankshaft web surfaces or the strains imposed upon the shaft by the cutting tools and wholly independent of the accuracy of the machined locating surfaces on the webs.

Another object is to provide a chucking device in which there is a pair of opposed abutment jaws adapted to engage relatively inaccurate chucking surfaces on a web of a crankshaft, in which one of the jaws serves to index the shaft relative to the axis of the chuck and in which the other jaw serves as the clamping means cooperating with the first mentioned jaw to accurately hold the shaft in proper position in the chuck irrespective of the accuracy of machining of the chucking surfaces cut on the web.

Another object is to provide a procedure for chucking a crankshaft in which the shaft is prepared with relatively inaccurate chucking surfaces having no relation to the finished accuracy of the shaft and to provide a chucking device which is capable of properly accurately supporting the crankshaft in a lathe by means of said chucking surfaces so prepared so as to wholly eliminate the problem of accurately machining locating areas on the webs while at the same time accomplishing the chucking of the crankshaft with the highest degree of accuracy and on a rapid production basis.

Further features and advantages of this invention will appear from the following detailed description of the drawings in which:

Figure I is an end elevation of the stub end center drive chuck for a double center drive lathe embodying the features of this invention.

Figure II is a diagrammatic section on the line II—II of Figure I.

Figure III is a section on the line III—III of Figures I and V.

Figure IV is a diagrammatic section on the line VI—VI of Figures I and V.

Figure V is an end elevation of the flange end center drive chuck for a double center drive lathe embodying the features of this invention.

Figure VI is a section on the line VI—VI of Figures I and III.

Figure VII is a diagrammatic view showing the general arrangement of the flange end center drive chuck, the stub end center drive chuck, and the tailstock centers with relation to the crankshaft to be turned.

Noting Figure VII, the chuck I nearest the flange end portion 2 of the crankshaft C will be called the flange end chuck while the chuck 3 being nearest the stub end 4 of the crankshaft will be known as the stub end chuck. The crankshaft C is supported at its ends on the lathe centers 5 and 6 carried in appropriate tailstocks 7.

In Figure V is shown the flange end chuck I having the driving ring gear 1a in which is fixed the segmental piece 7 securely held to the ring gear 1a by the screws 8. Slidably mounted in a radially extending bore 9 (Figure IV) formed in the piece 7 is the work engaging jaw 10 having an integral stem 11 nicely fitting in the bore 9. This jaw 10 is normally urged radially outwardly by means of the tension springs 12 connected to the pins 13 fixed in the piece 7 and to the pins 14 fixed to the jaw 10.

In order to move the jaw 10 inwardly toward the axis of rotation 15 of the chuck, a cam plunger 16 is arranged to slide in the bore 17 formed in the piece 7, the plunger 16 having a cam surface 18 engaging an abutment surface 19 formed in the bottom of the bifurcated end portion 20 of the stem 11. In order to move this cam plunger 16 a stem 21 formed integral therewith is provided with a rack 22 which is engaged by a segmental pinion 23 formed on the rock shaft 24 journaled in the bore 25 in the piece 7. A hand lever 26a fixed on this rock shaft 24 provides means for manipulating the jaw 10 relative to the axis 15 of the chuck. After the crankshaft C has been properly centered on the centers 5 and 6 the lever 26a is moved clockwise (Figures I and V), to move the angularly related surfaces 10a and 10b into firm engagement with chucking surfaces 26 and 27 of the V-notch 28 in the web 29 of the crankshaft C to properly seat these surfaces with equal pressure and rotate the crankshaft to proper indexed position in the chuck without deflecting the crankshaft from its true precentered position. The crankshaft is then ready to be clamped in the chuck.

The clamping mechanism comprises the link 30 pivotally mounted on the pin 31 carried in the piece 7 and the link 32 pivotally mounted on bushings 33 on the rock shaft 24. The outer ends of these links 30 and 32 are connected together by an eccentric clamping means comprising the splined eccentric rock shaft 34 which is journaled in the bushings 35 fixed in the link 30 by the screws 36. The eccentric portion 37 is rotatable in the bushing 38 carried in the link 30 so that when a suitable wrench is placed in the splined bore of the rock shaft 34 the ends of the links may be brought toward or moved away from each other with great force. A set screw 39 carried in one of the bushings 35 engages in a segmental annular slot 40 in the rock shaft 34 to limit its rocking movement to thereby automatically keep the eccentric portion properly oriented for effective clamping action.

On the link 30 is carried the work engaging jaw 41 which is slidably mounted on the surface 42 of the link 30 for movement substantially perpendicular to the direction of movement of the jaw 10 and substantially tangentially of the surface to be engaged on the work piece. Appropriate screws 43 threaded in the link 30 and passing through clearance holes 44 in the jaw 41 serve to hold the jaw in proper sliding engagement with the surface 42 of the link 30. The jaw 41 has angularly related work engaging faces 41a and 41b which engage the chucking surfaces 45 and 46 of the V-notch 47 in the web 29 of the crankshaft C.

It will be apparent that when the eccentric rock shaft is tightened to bring the ends of the links 30 and 32 toward each other, the link 30 will swing downwardly bringing the jaw 41 into the slot 47 in the crankshaft. Because of the wedge shaped construction of the jaw 41 and the notch 47, the jaw will float on the surface 42 until both of the surfaces 45 and 46 are equally and firmly engaged by the surfaces 41a and 41b of the jaw 41 without in any way rotating or otherwise displacing the crankshaft from true centered position. The radial component of force exerted by this jaw 41 is completely absorbed by the jaw 10 which is fixed at this time as described.

It is to be noted that, since the link 30 is pivotally mounted on the bushings 33 on the rock shaft 24, when the clamping eccentric 34 is tightened thus pulling the link 32 upward (Figures I and V) the rock shaft 24 will be pulled upward thus binding it in the bore 25 of the piece 7 so it cannot rotate, thus preventing the cam plunger 16 from moving to thereby automatically lock the jaw 10 in its engaged position with the work when the clamping means is tightened.

In order to prevent any slipping of the jaw 41 after the work has been clamped up, which might occur from the action of the cutting tools on the work piece as the chuck is rotating (counterclockwise in Figures I and V), a back-up wedge 48, Figure VI, is provided which has a straight face 49 engaging the hardened back up block 50 fixed to the link 30 by screws 51 and a tapered face 52 engaging the mating tapered face 53 on the jaw 10. A suitable actuating thumb screw 54 passes through a clearance hole 55 in the jaw 10 and is threaded 56 into the wedge 48. A compression spring 57 between the surface 58 of the jaw 10 and the bottom of the counterbore 59 in the wedge serves to release the wedge from between the block 50 and jaw 10 allowing it to float freely. After the jaw 10 has been properly clamped up on the crankshaft, the screw 54 is tightened to bring up the wedge 48 between the block 50 and the jaw to prevent further movement of said jaw during driving rotation of the chuck.

When a pair of such chucks are used to drive the crankshaft as shown in Figure VII, the second chuck in this instance the stub end chuck 3 shown in Figure I having a ring gear 3a has the same clamping mechanism as the chuck of Figure V. The jaw 10 of this stub end chuck is also actuated in the same manner as the jaw 10 in the Figure V chuck but it engages the work piece in a distinctly different manner so as to completely absorb the clamping forces of the jaw 41 as in the Figure V chuck but does not tend to rotate the crankshaft to an indexed position as in said Figure V chuck.

In the Figure I chuck, the jaw 10 has a single work engaging surface 10c arranged substantially perpendicular to the radial movement of the jaw 10 which engages a mating surface 60 in the bottom of the V-notch 28 in the crankshaft web 61. These surfaces when in engagement serve to completely absorb all of the forces set up by the clamping action of the jaw 41 but they do not affect the indexed position of the shaft as previously established by the jaw 10 in the chuck 1 so that no twisting of the shaft results when the second chuck 3 is tightened.

When the two chucks 1 and 3 are used the method of chucking is as follows: The work or crankshaft C is loaded into the ring gears 1a and 3a and properly mounted on the centers 5 and 6 (Figure VII). The lever 26a (Figure V) is then operated to bring the jaw 10 up to a nice touch into the notch 28 of the crankshaft, thus indexing or circumferentially orienting the shaft in the chucks. The jaw 10 of the other chuck (Figure I) is then brought up to nicely engage the surfaces 60 and 10c. Then the jaw 41 of the first chuck (Figure V) is tightened and then finally the jaw 41 of the second chuck (Figure I) is tightened by means of the eccentrics as described.

Obviously great savings and a much more accurate product may be effected by following the above procedure and utilizing the chucking mechanism set forth, this being due to avoiding the preparation of critically accurate locating areas on the crankshaft and substituting the not particular chucking surfaces which may be much more easily, quickly, and cheaply prepared on the shaft. Also by use of the particular chuck with such type of chucking areas much more accurate work may be turned out while rigidly and positively holding the work during rapid turning of the bearing portions. This obviously effects even further savings in the subsequent straightening and grinding operations which were formerly always necessary in the earlier procedures discussed above because of the inability in the past to produce sufficiently accurately turned crankshafts.

Having thus fully set forth and described our invention what we claim and desire to secure by United States Letters Patent is:

1. In a chucking device for a lathe, a rotary chuck body, a work engaging jaw mounted in said body for movement radially of the axis of said chuck body and having angularly related faces adapted to engage the sides of a V-notch chucking surface formed on a work piece prelocated on the axis of rotation of said lathe so as to properly index the work piece in said chucking device, means for locking said jaw in work engaged position, clamping means on said chuck body, a work engaging jaw mounted on said clamping means so as to have tangential floating movement relative to said work piece substantially perpendicular to the direction of movement of said first mentioned jaw, and means for moving said clamping means and said second mentioned jaw in opposed relation to said first mentioned jaw.

2. In a chucking device for a lathe, a rotary chuck body, a work engaging jaw mounted in said body for movement radially of the axis of said chuck body and having angularly related faces adapted to engage the sides of a V-notch chucking surface formed on a work piece prelocated on the axis of rotation of said lathe so as to properly index the work piece in said chucking device, means for locking said jaw in work engaged position, clamping means on said chuck body, a work engaging jaw mounted on said clamping means so as to have tangential floating movement relative to said work piece substantially perpendicular to the direction of movement of said first mentioned jaw, means for moving said clamping means and said second mentioned jaw in opposed relation to said first mentioned jaw, and means for locking said second mentioned jaw against said floating movement.

3. In a lathe, a pair of tailstocks, centers in said tailstocks, a center drive chuck having a rotary chuck body located between said centers, a work engaging jaw movable radially of the axis of rotation of said lathe, angularly related surfaces on said jaw adapted to engage mating angularly related faces of a chucking notch formed on a work piece prelocated on said centers, means for moving said jaw into initial engagement with said work to index said work without distorting it from its true prelocated position, means for holding said jaw in initial engaged position, clamping means for moving a second jaw, having angularly related surfaces to engage mating angularly related faces of a chucking notch of said work piece, radially of said axis and in opposed relation to said first jaw, means permitting floating movement in said second jaw during operation of said clamping means in a direction substantially perpendicular to said line of clamping action, and means for locking said second jaw against said floating movement at the completion of said clamping.

4. In a lathe, a pair of tailstocks, centers in said tailstocks, a pair of center drive chucks having rotary chuck bodies located between said centers, a work engaging jaw in one of said chuck bodies movable radially of the axis of rotation of said lathe, angularly related work engaging surfaces on said jaw adapted to engage mating angularly related faces of a chucking notch formed on a work piece prelocated on said centers, a work engaging jaw in the other of said chuck bodies movable radially of the axis of rotation of said lathe, a work engaging surface on said jaw adapted to engage a mating surface on said work piece arranged substantially perpendicular to said line of radial movement of said jaw, means for moving said jaws into initial engagement with said work without distorting it from its true prelocated position, means for holding said jaws in initial engaged position, clamping means in each of said chuck bodies for moving associated jaws, having angularly related surfaces to engage mating angularly related faces of chucking notches of said work piece, radially of said axis and in opposed relation to said first mentioned jaws, means permitting floating movement in said jaws associated with said clamping means during the operation of said clamping means in a direction substantially perpendicular to said line of clamping action, and means for locking said jaws against said floating movement at the completion of said clamping.

5. In a chuck, a rotary chuck body, a V-shaped jaw movable relative to the axis of rotation of said chuck body to engage in a V-notch of a prelocated work piece in the chuck, cam means for moving said jaw toward said axis, clamping means having a clamping jaw movable relative to said axis to engage a V-notch on said work piece diametrically opposite said first mentioned jaw, means permitting floating movement in said clamping jaw perpendicular to said line of clamping action, means for locking said jaw against floating movement at the completion of said clamping action, and means for automatically locking said cam means against movement when said clamping means is tightened.

6. In a chuck, a rotary chuck body, a jaw movable relative to the axis of rotation of said chuck body to engage a tangential surface of said work piece perpendicular to the line of radial movement of said jaw, cam means for moving said jaw toward said axis, clamping means having a clamping jaw movable relative to said axis to engage a V-notch on said work piece diametrically opposite said first mentioned jaw perpendicular to said line of clamping action, means for locking said jaw against floating movement at the completion of said clamping action, and means for automatically locking said cam means against movement when said clamping means is tightened.

7. In a chuck, a ring gear, a segmental piece fixed in said ring gear, a work engaging jaw radially slidable in said piece, a pair of clamping links each pivotally mounted on said piece at one of their ends, eccentric clamping means interconnecting the outer ends of said links, a clamping jaw carried by one of said links for engaging the work in an opposed relation to said first mentioned jaw, means for moving said first mentioned jaw into engagement with a work piece in the chuck, and means whereby the tightening of said eccentric clamping means automatically renders said last mentioned means inoperative to hold said first mentioned jaw in work engaged position.

WILLIAM F. GROENE.
WALTER R. MEYER.